Dec. 2, 1958 — C. FENOGLIO — 2,862,521
VIBRATION DAMPING MEANS FOR PRESSURE SENSITIVE DEVICES
Filed Sept. 27, 1954
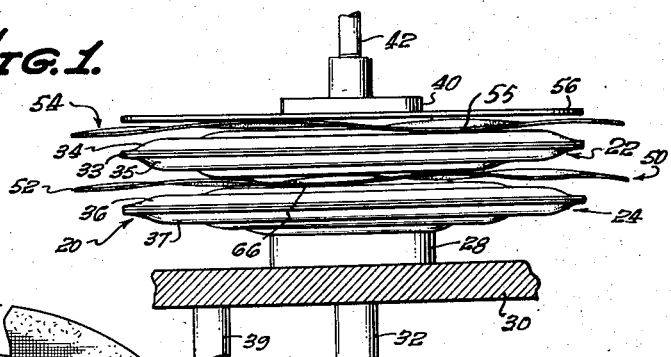
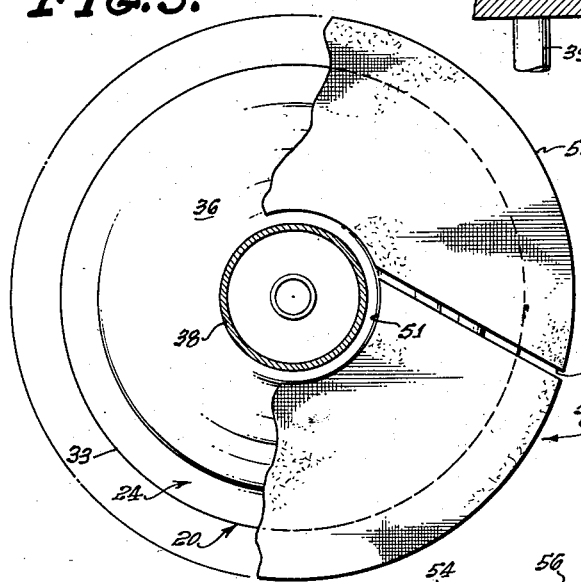
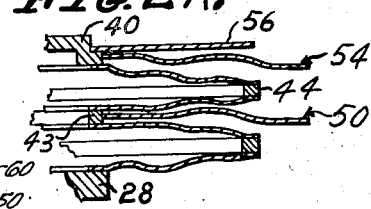
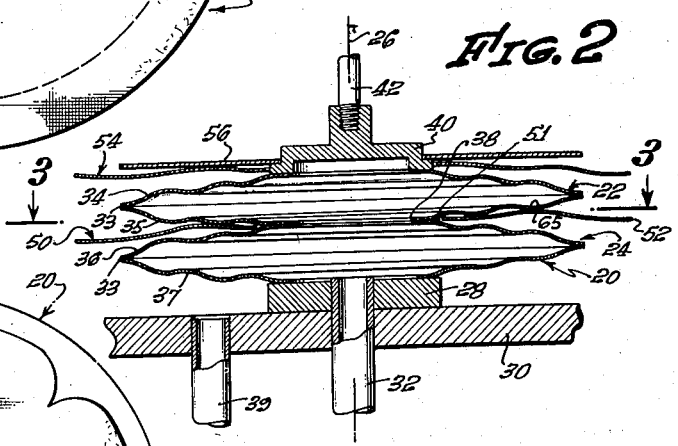
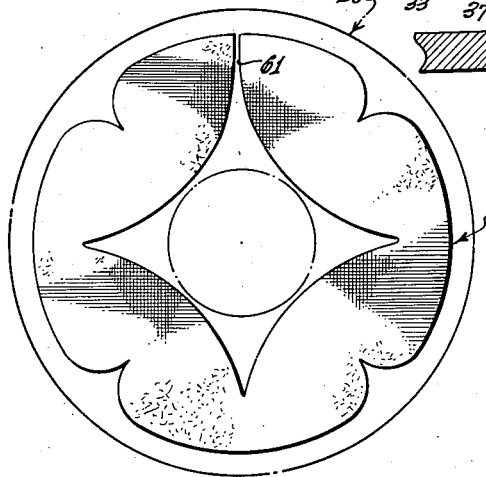
CHARLES FENOGLIO,
INVENTOR.
BY Barkelew & Scantlebury
ATTORNEYS.

United States Patent Office 2,862,521
Patented Dec. 2, 1958

2,862,521

VIBRATION DAMPING MEANS FOR PRESSURE SENSITIVE DEVICES

Charles Fenoglio, Pasadena, Calif., assignor to G. M. Giannini & Co. Inc., Pasadena, Calif., a corporation of New York Application September 27, 1954, Serial No. 458,445

6 Claims. (Cl. 137—781)

This invention relates to means for damping vibrations of sensitive instruments such as pressure responsive devices.

Such devices ordinarily include a relatively thin wall or diaphragm of resilient material that is deformable in response to differences of pressure applied to its opposite faces. Many pressure responsive devices comprise at least two such walls arranged in generally parallel spacedly opposed relation, with means for applying one pressure to their opposed faces and another pressure to their other faces. A pressure responsive capsule, for example, typically comprises a plurality of stacks, each of which includes two substantially plane walls of annular shape spaced axially of the capsule. And a Bourdon tube comprises two walls that are of rectangular rather than annular shape and that lie in generally cylindrical rather than in generally plane surfaces.

When pressure responsive devices of the type described are subjected to periodic mechanical vibrations, such as may be imposed from some external source, the initial amplitude of the vibrations is often greatly increased by resonance of the resilient pressure responsive walls. Such resonance is particularly marked when the frequency of the impressed vibration is close to a natural frequency of the pressure responsive structure. It may then prevent the device from performing its normal indicating or control function with accuracy, and may even permanently damage the delicate structure of the device.

Many attempts have been made to damp such vibrations, but none has been fully satisfactory. Fluid damping usually involves relatively complex structure that is expensive and difficult to maintain. Other damping means have employed mechanical friction from sliding surfaces or from deformation of rubber-like materials. However, such means typically vary in their action with changes of temperature. Furthermore, they tend to reduce the rate of response and the sensitivity of the pressure responsive device itself. Thus, for example, rings of sponge rubber have been inserted under compression between the stacks of a pressure responsive capsule. While such padding may help to control vibration by its relatively great mass, if for no other reason, it also prevents the capsule from moving freely in response to pressure changes. Any change in condition of the rubber, such as may be caused by changes of temperature or other factors, not only changes the damping action but also changes the rate of the instrument itself. And even if the condition of the rubber could be made to remain constant, its stiffness would set a serious limit upon the sensitivity of response of the capsule.

The present invention provides means capable of effectively damping instruments of the type described without appreciably affecting their rate or sensitivity of response. Moreover, the weight that must be added is relatively slight, and does not appreciably complicate the problem of balancing the instrument against acceleration.

It has been discovered that vibration of a pressure responsive diaphragm wall can be effectively damped by providing closely adjacent the wall, and preferably touching it lightly at spaced points, a sheet of relatively pliable material that is substantially non-resilient. The term "pliable" is intended to connote not only flexibility but the type of easy flexibility that requires relatively little force to bend the sheet-like material through an appreciable angle. The material preferably offers only slight resistance to such bending, developing only a relatively small restoring force. On the other hand, the term "substantially non-resilient" is not intended to imply complete absence of restoring force, such as the absolute limpness of wet paper, for example. The material preferably has some tendency to maintain a definite conformation, but is relatively easily flexed away from that conformation.

The required properties may be provided by sheet-like material of many different types. For example, woven fabric such as cloth or very soft wire mesh may provide the required flexibility. Soft types of paper may be used, although the properties of paper may be inconveniently sensitive to such conditions as humidity. Thin sheets of leather and of soft artificial or natural rubber may be used under suitable conditions of temperature and humidity. Certain plastics are obtainable in sheet form that provide the described properties and are only slightly sensitive to wide variations of conditions. A particularly satisfactory material of the latter type comprises polymerized tetrafluoroethylene, which is available commercially in sheets of suitable thickness and which is known by the trade name "Teflon." Teflon has the particular advantage that its physical properties are substantially independent of temperature over a wide range.

The optimum thickness of sheet-like material depends upon the particular material used, but is usually not highly critical. Successful results are obtained when the mass per unit area of the sheet is of the same order of magnitude as that of the diaphragm wall that is to be damped. Teflon sheets about 0.010 inch thick have been found highly satisfactory for damping vibrations of pressure sensitive capsules of conventional type.

The sheet-like material preferably extends over at least an appreciable portion of the area of the wall surface to be damped, and may usefully extend beyond that area. It is usually convenient, although it is not necessary, that the sheet material extend substantially continuously over the wall area. Two or more damping sheets may be superimposed to increase the damping action.

It is preferred that either the pressure sensitive wall or the damping sheet, or both, be so formed that one does not fit flatly against the other over the entire area that they have in common. In the case of pressure responsive capsules the annular capsule walls are usually slightly corrugated, so that even if the damping sheet is strictly flat, contact tends to be limited to the areas near the crests of the wall corrugations. The damping sheet may similarly be preformed with corrugations, but these are preferably slight and do not match directly the corrugations, if any, of the wall. Ordinarily, the thin sheet of damping material, even though not intentionally corrugated, is not strictly flat, but has relatively slight and preferably smooth irregularities of surface. The damping sheet, thus tends to contact the wall only at spaced areas or points, being transversely spaced from the wall at intermediate areas. At the points of contact, the sheet and wall are typically tangentially related.

The damping sheet may be mounted in any manner that leaves it substantially freely movable transversely of the wall. The amplitude of that transverse movement may be quite small, but is preferably at least equal to the amplitude of the impressed vibration to be damped. Such positioning may be provided in various ways. For example, edge portions or otherwise isolated portions of the sheet may be positively positioned, as by suitable clamping means, leaving intermediate portions free. Alternatively and preferably, a surface may be provided in generally parallel relation to the wall and spaced therefrom by a distance large compared to the thickness of the damping sheet. The sheet may then be loosely inserted between the wall and the surface, the irregularities of the sheet preferably causing it to lightly contact both the wall and the surface. However, those areas of the sheet that contact the surface and those that contact the wall are separated by other areas that are spaced between the wall and the surface. It is an important feature of that aspect of the invention that the areas of contact of the two opposing faces between which the damping sheet is positioned are mutually spaced in the plane of the sheet. Reference to the plane of the sheet is not, however, intended to imply that the sheet is strictly plane, but only to distinguish dimensions measured along the sheet surface from dimensions transverse of that surface.

When the device to be damped is a pressure responsive capsule having a plurality of stacks, the damping sheets may conveniently be of annular shape, and may be loosely inserted between the opposing annular walls of adjacent stacks. Alternatively a damping sheet of annular or of circular shape may be loosely contained within a single stack between its two annular walls. The damping sheet then has effective damping action on both of the walls, and each wall may be considered as a positioning surface which maintains the sheet in proper relation to the other wall.

A full understanding of the invention and of its further objects and advantages may be had from the following description of an illustrative embodiment. The particulars of that description, of which the accompanying drawings form a part, are for illustration only, and are not intended as a limitation upon the scope of the invention.

In the drawings:

Fig. 1 is a side elevation representing an illustrative pressure responsive capsule embodying the invention;

Fig. 2 is an axial section;

Fig. 2A is a detail of Fig. 2, illustrating alternative capsule structure;

Fig. 3 is a transverse section on line 3—3 of Fig. 2, partially broken away; and Fig. 4 is a schematic section corresponding to Fig. 3 but at reduced scale and illustrating a modification.

In the illustrative embodiment of Figs. 1 to 3, a pressure responsive capsule is represented generally at 20, comprising two axially aligned stacks 22 and 24. For clarity of description, but without implying any limitation upon the actual orientation of the device, the capsule axis 26 will be assumed vertical, with stack 22 above stack 24. Each stack comprises two annular wall elements, typically formed of thin resilient metal, with their outer circular edges connected effectively rigidly together, as by welding at 33. The upper and lower walls of upper stack 22 are indicated at 34 and 35, respectively; those of lower stack 24 at 36 and 37, respectively. The two adjacent walls 35 and 36 of the respective stacks are generally (although usually not precisely) parallel, and have their inner circular edges connected together effectively rigidly, as by welding at 38. As shown clearly in Fig. 2, the space between opposing walls under equilibrium conditions is then determined primarily by the wall portions closely adjacent the joined edges, which portions are typically relatively sharply curved and may be considered to constitute integral spacing structures. Alternatively, for example, the edges at 33 or at 38 may be connected via spacing rings of suitable diameter, as represented at 43 and 44 in Fig. 2A.

One end of the capsule, shown illustratively as the lower end, is typically fixedly mounted, as by the apertured fitting 28, on a support, represented schematically at 30, which may be part of the instrument frame. The capsule may be hermetically sealed and evacuated; or any suitable means, such as the tube indicated at 32, may be provided for admitting to the interior of the capsule a fluid, usually gaseous, under some definite pressure. The space surrounding the capsule may be enclosed by a pressure tight wall, of which support 30 may form a part, and similar means provided as indicated at 39, for admitting a typically gaseous fluid through that wall to the exterior surfaces of the capsule. Alternatively, those exterior surfaces may simply be exposed to air under atmospheric pressure. In any case, the axial elongation of the capsule is responsive to the difference between the pressures applied to its inner and outer surfaces. A fitting, indicated at 40, may be provided at the free end of the capsule ( the upper end, as illustrated) for connection of a linkage of any suitable type for actuation of indicating, recording, or transmitting means, as may be desired. Such linkage is indicated schematically at 42. Whereas in Fig. 1 two stacks are explicitly shown, it will be understood that a capsule of the type described may include any desired number of stacks.

In certain types of service, particularly in aircraft, a pressure responsive device of the type described may be subjected to relatively severe vibrations. Such vibrations are typically impressed upon the capsule via the support structure 30. The frequency of such vibrations varies widely, the most troublesome frequencies usually being those close to one or more natural frequencies of the capsule structure, or of the structure comprising the capsule and the linkage means considered as a dynamic unit. Such frequencies vary with many factors, such as mass and stiffness of the parts, but may be considered illustratively to lie in the lower range of acoustical frequencies. When the impressed frequency corresponds to such a natural frequency of oscillation of the instrument, resonance may cause the amplitude of the impressed vibration to be built up to a value that interferes with proper action of linkage 42 and is potentially destructive of the sensitive capsule structure.

In accordance with the present invention, such resonance can be prevented by damping means of a remarkably simple type. In illustrative form, such damping means may comprise an annular sheet of softly flexible material, preferably of the plastic already defined and known as Teflon, positioned loosely closely adjacent and generally parallel to one or more of the deformable walls of the capsule. One such damping sheet is represented at 50, loosely inserted between the opposing walls 35 and 36 of two adjacent stacks. Each of those walls acts as confining structure for maintaining the damping sheet in the desired lightly contacting relation with the other wall, engaging wall 35 at such points as 65 (Fig. 2) and wall 36 at such points as 66 (Fig. 1). A second illustrative damping sheet is represented at 54, positioned opposite and closely adjacent upper wall 34, which is an end wall of the capsule. An effectively rigid wall 56 may be mounted in spaced relation to capsule wall 34, as on fitting 40, thereby providing a retaining surface for sheet 54. It is noted that sheet 54 does not happen to touch capsule wall 34 in the axial plane of Fig. 2, but does touch it in other axial planes, as shown, for example, at 55 in Fig. 1. Sheet 54 is thus loosely confined between capsule wall 34 and retaining wall 56, both of which it touches at mutually spaced points.

The inner and outer edges of the sheets 50 and 54 may vary greatly in form and dimensions. The arrangement indicated in Figs. 1 to 3 is particularly simple and economical, and provides effective damping action. As shown, sheet 50 has a circular inner edge 51 the radius of which is slightly larger than the outside radius of the neck portion between the two stacks of the capsule, formed in the present instance by the joint at 38. The sheet is therefore free to move parallel to its plane within the limited range permitted by the clearance between those two radii. Alternatively, that clearance may be eliminated entirely, giving positive definition of the damping sheet in its own plane. It is generally preferred, however, to avoid such positive confinement of the sheet, even in its own plane, since it may affect operation of the capsule. Furthermore, such confinement tends to restrict also the transverse movement of the sheet near its inner edge.

As shown, sheet 50 has a circular outer edge 52, the radius of which is somewhat larger than the maximum radius of the capsule, so that the sheet protrudes radially outwardly beyond the capsule walls. Alternatively, outer edge 52 may have a radius equal to or considerably less than the maximum capsule radius, the area of the damping sheet in the latter case being less than that of the capsule walls. Edges 51 and 52 need not be circular, but may be square, for example, or may be fluted or otherwise varied in any desired manner, as indicated schematically in Fig. 4 at 50a. To facilitate insertion and removal of the damping sheet, a cut may be provided between inner and outer edges 51 and 52. That cut preferably extends obliquely and is substantially tangent to circular inner edge 51, as at 60 in Fig. 3, but may also be radial, as indicated at 61 in Fig. 4.

The damping material need not form a complete annular wafer, but may comprise portions of any desired shape, mounted in any suitable manner, as by clamping of edge portions, that leaves the main body of the material freely movable transversely.

Whereas the described figures represent a complete capsule, and the invention is particularly effective in combination with such structure, it will be recognized that wall 34, for example, may alternatively be considered to represent a single diaphragm subject to different pressures on its two faces, sheet 54 then representing means for damping vibrations of such a diaphragm, and wall 56 representing any suitable positioning means for that damping sheet.

The remarkable effectiveness of the described type of damping means is not fully understood, and the scope of the invention is not intended to be limited by the correctness or incorrectness of any particular theory of its operation. However, it appears that the efficacy of the invention is closely related to the softness or pliability of the described type of material and to the lightness and tangential nature of the contact between the opposing faces of the damping sheet and the pressure responsive wall. A damping structure of the type described probably has no well defined natural frequency of vibration, since it is inherently substantially non-resilient. It therefore tends to obscure the inherent natural frequencies of the capsule. Although the mass of each damping sheet is typically only of the same order as that of the individual capsule walls, that relatively low mass perhaps provides particularly effective damping because the degree of loading of the vibrating wall varies greatly during the course of each cycle of vibration. Moreover, that variation is relatively smooth and gradual, rather than abrupt in its nature.

For example, if an impressed vibration tends to cause capsule wall 36 to move upward from the position shown in Fig. 1, its contact at such a point as 66 with damping sheet 50 causes that portion of the sheet close to point 66 to move upward with the wall. But portions of the sheet not close to such a contact point are initially spaced from wall 36, and the pliability of the sheet prevents the upward movement from being immediately impressed upon those portions. Hence, wall 36 may be considered initially to be dynamically loaded only by the relatively small portions of sheet 50 immediately adjacent a contact point 66. As the upward movement continues, however, the area of each such contact region increases, gradually increasing the effective dynamic loading of the wall. That variation in loading probably tends to eliminate any sharply defined frequencies of resonance. Whatever the precise explanation may be, the damping is accomplished through relatively light contact with the wall faces, and without application of any appreciable static forces such as might affect the rate of pressure response of the capsule.

I claim:

1. In combination with a pressure responsive device having a thin resilient wall that is deformable in response to differences in the pressures acting upon the opposite faces of the wall, means for damping vibration of the pressure responsive device comprising structure forming a surface in spaced relation to the wall, and a sheet-like formation of relatively pliable material loosely confined between the surface and the wall, a major portion of the formation being freely movable between a position spaced from the wall and a position lightly touching the wall.

2. In combination with a pressure responsive device having a thin resilient wall that is deformable in response to differences in the pressures acting upon the opposite faces of the wall, means for damping vibration of the pressure responsive device comprising a sheet-like formation of relatively pliable material, and means confining the formation closely adjacent and generally parallel to a face of the wall, a major portion of the formation being shiftable, in response to vibration of the wall, between a position spaced from the wall and a position lightly touching the wall.

3. In combination with a pressure responsive device having a thin resilient wall that is deformable in response to differences in the pressures acting upon the opposite faces of the wall, means for damping vibration of the pressure responsive device comprising relatively pliable sheet-like material mounted closely adjacent and generally parallel to a face of the wall, said material tangentially contacting the face of the wall lightly at a plurality of mutually spaced points and being otherwise spaced from the wall.

4. In combination with a pressure responsive device that includes at least one pair of spacedly opposed walls that are deformable in response to differences of the pressures supplied to their adjacent faces and to their other faces; means for damping vibrations of said pressure responsive device, comprising a sheet of relatively pliable material having a thickness small compared to the mutual spacing of the walls and being mounted between the walls, the opposite faces of the sheet lightly contacting the respective walls at respective points that are mutually spaced in the plane of the sheet.

5. In combination with a pressure responsive capsule having a plurality of axially spaced stacks; means for damping vibration of the capsule, comprising an annular wafer of relatively pliable material mounted between the opposing walls of two adjacent stacks, the thickness of the wafer being small compared to the mutual spacing of said walls.

6. In combination with a pressure responsive capsule of the type that includes at least two annular walls in spacedly opposed coaxial relation, and spacing means connecting the walls substantially rigidly along one pair of corresponding circular edges, the axial spacing of the other pair of circular edges being variable in response to pressure; means for damping vibration of the capsule, comprising a sheet of relatively pliable and substantially non-resilient material mounted between the walls of the capsule in generally parallel relation therewith and having a circular edge adjacent the said spacing means of the capsule, movement of the sheet in its own plane being limited substantially solely by contact of its said edge with that spacing means, and transverse movement of the sheet being limited substantially solely by contact of its faces with the opposing faces of the respective capsule walls.

References Cited in the file of this patent

UNITED STATES PATENTS

| | | |
|---|---|---|
| 1,630,292 | Ely | May 31, 1927 |
| 2,434,794 | Giesler | Jan. 20, 1948 |